United States Patent
Yang et al.

(10) Patent No.: US 12,553,963 B2
(45) Date of Patent: Feb. 17, 2026

(54) GAPPED DEGENERATE BIRDCAGE COIL

(71) Applicant: Quality Electrodynamics, LLC, Mayfield Village, OH (US)

(72) Inventors: Xiaoyu Yang, Indiana, PA (US); Tsinghua Zheng, Chesterland, OH (US); Derick Petrey, Mayfield Village, OH (US); Labros Petropoulos, Chardon, OH (US)

(73) Assignee: Quality Electrodynamics, LLC, Mayfield Village, OH (US)

( * ) Notice: Subject to any disclaimer, the term of this patent is extended or adjusted under 35 U.S.C. 154(b) by 245 days.

(21) Appl. No.: 18/454,859

(22) Filed: Aug. 24, 2023

(65) Prior Publication Data
US 2024/0069130 A1    Feb. 29, 2024

Related U.S. Application Data

(60) Provisional application No. 63/401,326, filed on Aug. 26, 2022.

(51) Int. Cl.
*G01R 33/36*    (2006.01)
*G01R 33/34*    (2006.01)

(52) U.S. Cl.
CPC ... *G01R 33/34076* (2013.01); *G01R 33/3628* (2013.01)

(58) Field of Classification Search
CPC .............. G01R 33/00; G01R 33/34076; G01R 33/0035; G01R 33/0023; G01R 33/0017; G01R 31/3191; G01B 7/004; G01C 17/38
See application file for complete search history.

(56) References Cited

U.S. PATENT DOCUMENTS

| | | | |
|---|---|---|---|
| 4,692,705 A | 9/1987 | Hayes | |
| 6,404,201 B1* | 6/2002 | Boskamp | G01R 33/34076 324/318 |
| 7,091,721 B2 | 8/2006 | Jevtic | |
| 2005/0107686 A1* | 5/2005 | Chan | G01R 33/3415 600/422 |
| 2013/0221966 A1* | 8/2013 | Zhu | G01R 33/3642 324/318 |

(Continued)

OTHER PUBLICATIONS

Wang, Jianmin. "A Novel Method to Reduce the Signal Coupling of Surface Coils for MRI." Proc. ISMRM 4:1434, published in 1996.

(Continued)

*Primary Examiner* — Lee E Rodak
*Assistant Examiner* — Taqi R Nasir
(74) *Attorney, Agent, or Firm* — Eschweiler & Potashnik, LLC

(57) ABSTRACT

A magnetic resonance imaging (MRI) system can include a gapped degenerate birdcage magnetic resonance imaging (MRI) radio frequency (RF) coil. The gapped degenerate birdcage MRI RF coil is tuned to a degenerate mode and comprises a row of RF coil elements and a mechanical gap. The RF coil elements may also be referred to as channels or meshes. The row extends circumferentially around an axis of a cylindrical-like former, and mechanical gap separates a pair of directly neighboring RF coil elements in the row. A transformer, a partial overlap, or the like minimizes inductive coupling between the pair of directly neighboring RF coil elements.

21 Claims, 9 Drawing Sheets

(56) References Cited

U.S. PATENT DOCUMENTS

2018/0364318 A1* 12/2018 Yang .................. G01R 33/3628
2019/0257897 A1*  8/2019 Yang ................ G01R 33/34084
2020/0292643 A1*  9/2020 Yang ................... G01R 33/365
2021/0318398 A1* 10/2021 Yang ................... G01R 33/365

OTHER PUBLICATIONS

Tropp, James. "The Hybrid Bird Cage Resonator." Proceedings of the 11th Annual Meeting of SMRM, Berlin, Germany, p. 4009, published in 1992.

Alagappan et al. "Degenerate Mode Band-Pass Birdcage Coil for Accelerated Parallel Excitation" Magnetic Resonance in Medicine 57:1148-1158, published in 2007.

Cheng et al. "A degeneracy study in the circulant and bordered-circulant approach to birdcage and planar coils" MAGMA (2003) 16:103-111, DOI 10.1007/s10334-003-0009-5, published on Jul. 25, 2003.

\* cited by examiner

800 ↘

```
┌─────────────────────────────────────────────────────────────────────┐
│  Provide a gapped degenerate birdcage magnetic resonance imaging (MRI)  │
│  radio frequency (RF) coil that includes a pair of directly neighboring RF coil │─ 810
│  elements in a row of RF coil elements with a mechanical gap separating the │
│              pair of directly neighboring RF coil elements                │
└─────────────────────────────────────────────────────────────────────┘
                                  │
                                  ▼
┌─────────────────────────────────────────────────────────────────────┐
│  Perform MRI on a scan target to generate an image of the scan target at a │
│  working frequency, wherein the gapped degenerate birdcage MRI RF coil is │─ 820
│  used as a transmit coil and/or as a receive coil while performing the MRI │
└─────────────────────────────────────────────────────────────────────┘
```

Fig. 8

GAPPED DEGENERATE BIRDCAGE COIL

REFERENCE TO RELATED APPLICATIONS

This application claims the benefit of U.S. Provisional Application No. 63/401,326 filed Aug. 26, 2022, entitled "METHODS TO IMPROVE DEGENERATE B1 FIELD UNIFORMITY IN PTX MRI COILS", the contents of which are herein incorporated by reference in their entirety.

BACKGROUND

Magnetic resonance imaging (MRI) involves the transmission and receipt of radio frequency (RF) energy. RF energy may be transmitted by an RF coil to create a radio frequency field or $B_1$ field that rotates a net magnetization. Further, resulting magnetic resonance (MR) signals may be received by an RF coil to detect precessing transverse magnetization. Thus, RF coils may be transmit (Tx) coils, receive (Rx) coils, or transmit and receive (Tx/Rx) coils.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. It is further noted that the examples portrayed in the figures should not be considered as the only aspects covered by the present disclosure.

FIG. 8 is a flow diagram of an example of a process for performing MRI using a gapped degenerate birdcage MRI RF coil.

DETAILED DESCRIPTION

Figure 1A:
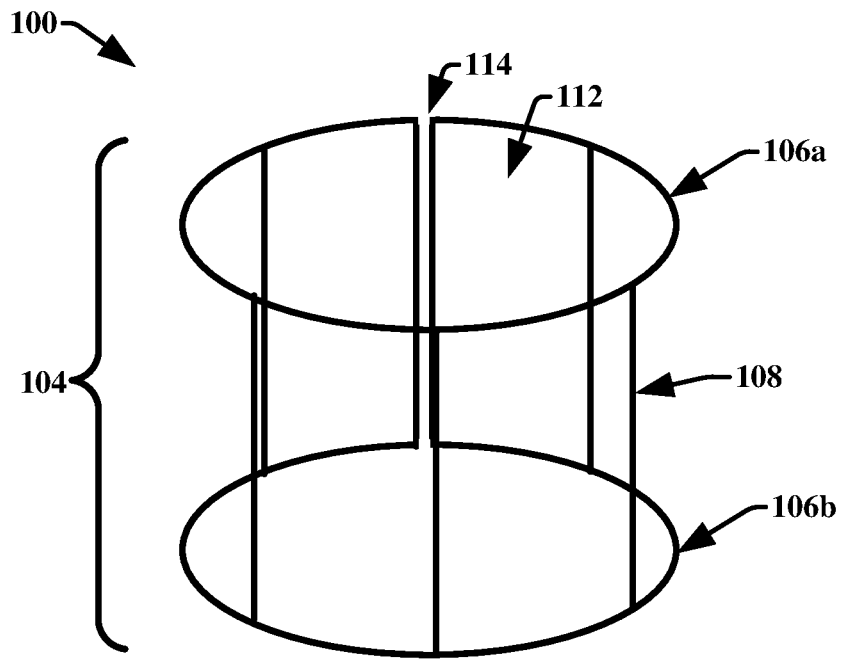
FIG. 1A is a perspective view of an example of a gapped degenerate birdcage magnetic resonance imaging (MRI) radio frequency (RF) coil.

The present disclosure provides many different aspects, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include aspects in which the first and second features are formed in direct contact, and may also include aspects in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various aspects and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

At 7 Tesla (T), the electromagnetic (EM) wavelength inside human anatomies becomes small. For example, the dielectric constant of human brain white matter is about 80. Therefore, at 7 T (e.g., ~297 megahertz (MHz)), the EM wavelength is about 11.3 centimeters (cm). Within one wavelength along the k vector direction (e.g., the EM field travelling direction), there are at least two zero EM field magnitude points. They are observed as dark spots or dark spot artifacts (e.g., imaging artifacts). Because most people's heads are greater than 11.3 cm, dark spot artifacts are an issue. Parallel transmission (pTx) magnetic resonance imaging (MRI) radio frequency (RF) coils may be used to address this.

A pTx MRI RF coil allows each transmit (Tx) channel of the coil to generate its own magnitude and phase field to enhance transmitting $B_1$ uniformity at the targeted imaging area. An example pTx MRI RF coil configuration can use multiple loop channels to surround an imaging area. Because the standard RF power amplifier impedance is 50 Ohms, special channel isolation techniques, such as a transformer approach, an overlap approach, a capacitor approach, a capacitor ladder approach, etc. can be used to achieve good isolations among all loop channels (e.g., RF coil elements). However, the aforementioned loop coil configuration can have an issue in that Tx efficiency can be low (e.g., demanding significantly more Tx power to operate compared to a typical birdcage coil for a reasonable uniform $B_1$ field generation). The cause of the issue is that the loop coil configuration can have significantly more current compared to a rung of a birdcage coil and the number of the rungs is only 50% of the number of loops.

To understand this variation in Tx efficiency, an eight-loop configuration can be examined in comparison with an eight-rung birdcage configuration in circular polarized (CP) mode. The CP mode means that each loop or mesh has the same current magnitude and the adjacent loops/meshes along a row of RF coil elements have a 45-degree phase difference either in a clockwise direction or a counterclockwise direction depending on the CP direction. When a coil is in resonance and in stable state, the power requirement equals the power consumption of the coil resistance. Supposing Ir is the loop or mesh current, and R is the rung resistance, the rung power consumption of the eight-loop configuration is $2I_r^2R$, while the rung power consumption of the eight-rung birdcage configuration is $(2I_{r*}\mathrm{Sin}(22.5\ \mathrm{deg}))^2*R$, which is equal to $0.59*1, 2\ R$. Hence, this explains the significantly higher Tx efficiency of the birdcage coil.

Tx power is not only expensive but is also safety related. For example, MRI RF coils are to pass a root mean square (RMS) power test under a pre-defined $B_1$ value to meet safety regulations. If an RF coil is not Tx efficient, the RF coil demands more power to achieve the same $B_1$ value, in which the extra Tx power causes the coil temperature to be higher. Because there is a stringent safety regulation regarding temperature, a higher coil temperature could fail regulatory requirements. Therefore, a Tx efficient coil is desirable.

A degenerate birdcage MRI RF coil has a coil configuration that can satisfy the Tx efficiency demands, while keeping the channel or mesh currents of the RF coil elements decoupled from each other. The degenerate birdcage MRI RF coil has the same structure as a typical birdcage coil, and both rings and rungs of the RF coil elements include capacitors. Further, when the ring and rung capacitor values of each RF coil element are correctly configured, all resonant modes, except the ring mode in which there are no rung currents flowing, collapse to a same frequency. Therefore, when a birdcage coil is in the degenerate mode, each RF current element (e.g., mesh) has good isolation, which allows a degenerate birdcage coil to be used as a pTx coil with each RF current element acting as one pTx channel.

A challenge in the typical degenerate birdcage coil is coupling between one of the ring modes and the RF coil elements. The typical degenerate birdcage has two independent rings. One is for channel feeding, where the matching circuits are at, and the other has no-matching circuits. Each ring has its own inductance and capacitance. Thus, each ring can resonate at a frequency and generate a magnetic field along a cylindrical axis of the birdcage coil. Since both rings may have the same inductances and capacitances, they may resonate at the same frequency. The two rings face each other and have non-trivial mutual inductance. This coupling causes the ring frequency splitting (e.g., one resonant peak becomes two resonant peaks). The strength of the mutual inductance decides how much the frequency splitting is. If one of the two frequencies is close to the working frequency (e.g., Larmor frequency), the ring mode may couple to the RF coil elements. This may make tuning difficult and cause uniformity degradation.

Various aspects of the present disclosure are directed towards a gapped degenerate birdcage MRI RF coil, as well as an MRI system that uses such a gapped degenerate birdcage MRI RF coil. The gapped degenerate birdcage MRI RF coil includes a row of RF coil elements (which may also be referred to as channels or meshes) that circumferentially surround an axis of a cylindrical-like former (e.g., for a head anatomy, a knee anatomy, a wrist anatomy, etc.). Further, the gapped degenerate birdcage MRI RF coil has a gap that separates a pair of directly neighboring RF coil elements in the row. As such, the pair of directly neighboring RF coil elements are defined by non-overlapping sets of rungs and ends rings of the gapped degenerate birdcage MRI RF coil are discontinuous at the gap. As explained hereafter, the gap may improve ease of tuning and/or improve $B_1$ magnetic field uniformity.

The gapped degenerate birdcage MRI RF coil may, for example, be used as a system built-in whole-body coil (WBC) or as a local coil. The local coil may, for example, be a head coil, a knee coil, a wrist coil, or the like. Further, the gapped degenerate birdcage MRI RF coil may, for example, be used in the field strength from very low frequency, such as less than 0.1 T, to very high frequency, such as 7 T, for example.

In addition to being a large expense, Tx power may also be a safety concern. RF coils of an MRI system have to pass a RMS power test under a pre-defined $B_1$ value to meet safety regulations. If a coil is not Tx efficient, it requires more power to achieve the same $B_1$ value and the extra Tx power causes the coil temperature to be higher. Because of stringent safety regulations regarding temperature, a higher coil temperature may fail the safety regulations. Therefore, a Tx efficient coil may be desirable.

A degenerate birdcage MRI RF coil can enable a high transmit efficiency with a good $B_1$ value. Further, a typical degenerate birdcage MRI RF coil is non-gapped in that end rings are continuous and each RF coil element (e.g., mesh) shares a rung with each neighboring RF coil element. However, such a non-gapped degenerate birdcage MRI RF coil suffers from difficulty of tuning and/or poor $B_1$ magnetic field uniformity. A gapped degenerate birdcage MRI RF coil may, for example, ease tuning and/or improve $B_1$ magnetic field uniformity.

A gapped degenerate birdcage MRI RF coil includes a plurality of RF coil elements (e.g., meshes or channels) arranged in a row circumferentially around an axis of a cylindrical-like former. Further, the gapped degenerate birdcage MRI RF coil includes one or more mechanical gaps. Each of the one or more mechanical gaps separates one set of RF coil elements from another set of RF coil elements within the row. For example, a set of four RF coil elements can be separated from another set of four RF coil elements within the row. A set of RF coil elements may, for example, refer to a continuous grouping of one or more RF coil elements in the row, where each RF coil element of the grouping shares a rung with another RF coil element of the grouping. Further, each of the one or more mechanical gaps introduces a break in end rings of the gapped degenerate birdcage MRI RF coil and separates a pair of RF coil elements directly neighboring in the row. The pair of directly neighboring RF coil elements correspond to two different sets of RF coil elements that neighbor in the row.

Other numbers of RF coil elements for each set within the row, and more than two sets of RF coil elements in the row, are amenable. Further, other numbers of RF coils elements between the one or more sets within the row are also amenable. For example, a set of RF coils elements can include two RF coil elements, while another set of RF coil elements can include six RF coil elements. Likewise, more than two sets of different (or same) amounts of RF coil elements can also be within the row.

A transformer or an overlap (e.g., at least a partial overlap) of the RF coil elements can be configured between the directly neighboring RF coil elements of the different sets to minimize coupling (e.g., inductive coupling) there between, or to decouple the RF coil elements from one another so that a mesh current of one does not create an inductive current in the other. The row of RF coil elements can further include end rings that extend along each row and connect one or more sets of RF coil elements at opposite sides of the row, respectively.

The row of RF coil elements can further be configured to inductively couple to a WBC that operates in a Tx mode, via transmit circuitry, to increase a transmission efficiency or to inductively couple to another coil that operates in a receive (Rx) mode, via receive circuitry, to increase signal-to-noise ratio (SNR). The row of RF coil elements may be arranged on a cylindrical former, which can be tailored to specific anatomies. Such anatomies may, for example, include a head anatomy, a knee anatomy, a leg anatomy, a wrist anatomy, or some other suitable anatomy.

FIG. 1A illustrates a perspective view 100 of some aspects of a gapped degenerate birdcage MRI RF coil 104.

The gapped degenerate birdcage MRI RF coil 104 includes two end rings 106a, 106b (e.g., circular conductive loops) and a plurality of rungs 108 (e.g., conductive straight elements) connecting the two end rings 106a, 106b. The number of rungs can vary depending on the type of or size of the coil according to a particular anatomy being scanned. The end rings 106a, 106b and the rungs 108 form a row of RF coil elements 112 (e.g., meshes or channels) in a cylindrical arrangement (e.g., circumferentially around an axis). Each RF coil element 112 is defined by corresponding portions of the two end rings 106a, 106b and two directly neighboring rungs.

A mechanical gap 114 separates two directly neighboring RF coil elements in the row. As such, the two end rings 106a, 106b are discontinuous at the mechanical gap 114, and the two directly neighboring RF coil elements do not share a rung at the mechanical gap 114. Rather, the two directly neighboring RF coil elements have individual rungs at the mechanical gap 114. As such, the gapped degenerate birdcage MRI RF coil 104 may comprise N RF coil elements and N+1 rungs, where N is an integrated greater than 4 or some other suitable value. As explained hereafter, it has been appreciated that the mechanical gap 114 may improve the ease with which the gapped degenerate birdcage MRI RF coil 104 may be tuned. Further, it has been appreciated that the mechanical gap 114 may improve $B_1$ magnetic field uniformity.

The gapped degenerate birdcage MRI RF coil 104 is configured to operate in a degenerate mode. The degenerate mode may allow the gapped degenerate birdcage MRI RF coil 104 to operate with increased transmit efficiency and with good isolation between RF coil elements (e.g., meshes or channels). To achieve the degenerate mode, the gapped degenerate birdcage MRI RF coil 104 has capacitors (not shown) on the two end rings 106a, 106b and on the plurality of rungs 108. Further, the capacitors are tuned so all resonant modes of the degenerate birdcage MRI RF coil 104 (except for a ring mode where there is no rung current flowing) collapse to the same frequency (e.g., a Larmor frequency for MRI).

Because the gapped degenerate birdcage MRI RF coil 104 operates in the degenerate mode, each RF coil element is isolated from each other RF coil element in the row. Therefore, the gapped degenerate birdcage MRI RF coil 104 can be utilized as a pTx coil and each RF coil element acts as one pTx channel. Further, each RF coil element can be fed through a matching circuit at one ring side, which can be referred to as a feeding board.

In some aspects, the row of RF coil elements 112 comprises at least three RF coil elements 112, or some other suitable number of RF coil elements (e.g., four or more RF coil elements, or less than three RF coil elements). In some aspects, a shape of the row of RF coil elements 112 is defined wholly or partially by a cylindrical former (not shown), which is a housing structure used to support and maintain the cylindrical arrangement of the gapped degenerate birdcage MRI RF coil 104. In some aspects, the gapped degenerate birdcage MRI RF coil 104 is a local coil in a cylindrical arrangement configured to surround a body part (e.g., head, arm, leg, etc.). In other aspects, the gapped degenerate birdcage MRI RF coil 104 is a WBC.

The RF coil elements 112 may be formed by a conductive wire or strips (e.g., of copper or other conductive material) and may further comprise various circuits and circuit elements such as capacitors, amplifiers, diodes and/or the like. Each RF coil element 112 can have a same structure (e.g., size, circuitry, material, etc.), but is not limited thereto. In other aspects, some or all of the RF coil elements 112 may have different structures (e.g., size, circuitry, material, etc.) from one another. In the perspective view 100 of FIG. 1A, the aforementioned circuits and circuit elements are not included for ease of illustration.

In some aspects, the RF coil elements 112 may be used or operated as Rx coil elements in an Rx mode of the gapped degenerate birdcage MRI RF coil 104. For example, the gapped degenerate birdcage MRI RF coil 104 may be used as a phased array Rx coil in which each RF coil element 112 corresponds to a channel. The Rx mode of operation can utilize low noise preamplifiers and/or transmit-receive switches, which are not illustrated, for example. In other aspects, the RF coil elements 112 may be used as Tx coil elements in a Tx mode of the gapped degenerate birdcage MRI RF coil 104. For example, the RF coil elements 112 may be used as a parallel Tx coil. Thus, each RF coil element 112 in the row sends and/or receives RF pulses to the body part during imaging by MRI.

In FIG. 1A, the row comprises six RF coil elements 112. However, it will be appreciated that FIG. 1A is a non-limiting example. More or less RF coil elements 112 (e.g., 8 or some other suitable number) are amenable, and/or more or less rungs are amenable. As noted above, the gapped degenerate birdcage MRI RF coil 104 may comprise N RF coil elements and N+1 rungs, where N is an integrated greater than 4 or some other suitable value. Additionally, the gapped degenerate birdcage MRI RF coil 104 may also comprise various circuits and circuit elements (e.g., capacitors, amplifiers, diodes, and/or the like), which are not illustrated in the perspective view 100 of FIG. 1A for ease of illustration.

Figure 1B:
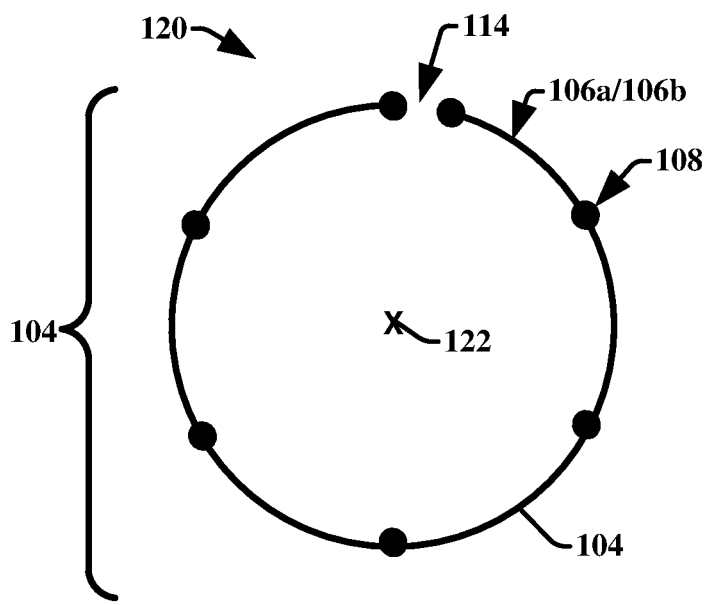
FIG. 1B is an axial view of an example of a gapped degenerate birdcage MRI RF coil.

FIG. 1B illustrates an axial view 120 of an example of the gapped degenerate birdcage MRI RF coil 104 of FIG. 1A.

The axial view 120 of FIG. 1B illustrates an axis 122 for a cylindrical shape of the gapped degenerate birdcage MRI RF coil 104. Note that the axis 122 is not illustrated in FIG. 1A for ease of illustration. In some aspects, each RF coil element 112 is spaced apart from the axis 122 by a same distance. It will be appreciated that the rungs (e.g., 108 of FIG. 1A) overlap with the two end rings 106a, 106b (see, e.g., FIG. A) and are emphasized by black circles.

The mechanical gap 114 introduces a discontinuity into the two end rings 106a, 106b. The mechanical gap 114 may, for example, be between a pair of directly neighboring rungs 108 so that some of the rungs 108 include shared rungs and non-shared rungs. Non-shared rungs correspond to different RF coils elements (e.g., different channels), while shared rungs shared by different RF coil elements. The mechanical gap 114 between the pair of directly neighboring rungs 108 can enable a first end ring current at one end ring (e.g., end ring 106a) and a second end ring current of another end ring (e.g., 106b) that are mutually coupled to combine to a single end ring current with a counter-rotational mode and without a co-rotational mode.

In a non-gapped degenerate birdcage, two end rings and their coupling normally create a co-rotation mode and a counter-rotation mode. The co-rotation mode is defined as the two end ring currents flowing in the same direction, and the counter-rotation is defined as the two end ring currents flowing in opposite directions. The counter-rotation mode, not the co-rotation mode, has a similar current pattern as the gapped degenerate birdcage MRI RF coil 104.

Normally, the counter rotation mode frequency is higher than the working frequency, and the co-rotation mode frequency is lower than the working frequency in the co-rotation mode. However, if the co-rotation mode is too close to the working frequency, tuning of the non-gapped degenerate birdcage coil tuning becomes more difficult. The mechanical gap 114 eliminate the co-rotation mode in the gapped degenerate birdcage MRI RF coil 104, so the two end rings 106a, 106b of the gapped degenerate birdcage MRI RF coil 104 have only one mode that is nearly the same as the counter-rotation mode. This makes tuning of the gapped degenerate birdcage MRI RF coil 104 much easier than a non-gapped bridge coil.

Additionally, there is no electrical connection between directly neighboring RF coil elements 112 at the mechanical gap 114. This no-connection may give additional advantage in some applications, such as a splitting coil design.

Figure 2A:
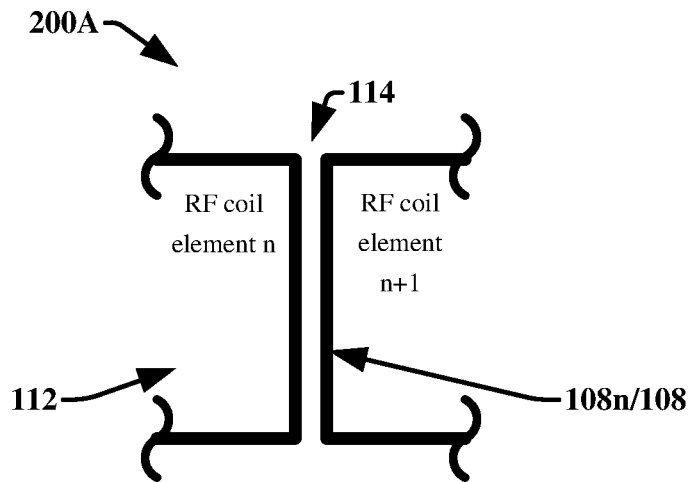
FIG. 2A is a view of an example of a portion of a gapped degenerate birdcage MRI RF coil at a gap of the gapped degenerate birdcage MRI RF coil.

FIG. 2A illustrates a view of an example of a portion 200A of the gapped degenerate birdcage MRI RF coil 104 of FIG. 1A at the mechanical gap 114.

The gapped degenerate birdcage MRI RF coil 104 has a pair of non-shared rungs 108n separated from each other at the mechanical gap 114. The non-shared rungs 108n directly neighbor and are individual to two of the RF coil elements 112, which are respectively labeled RF coil element n and RF coil element n+1. n is an integer representing an index for the RF coil elements 112, where the RF coil elements are indexed from 1 to N. N is a total number (e.g., six or the like) of the RF coil elements 112.

Figure 2B:
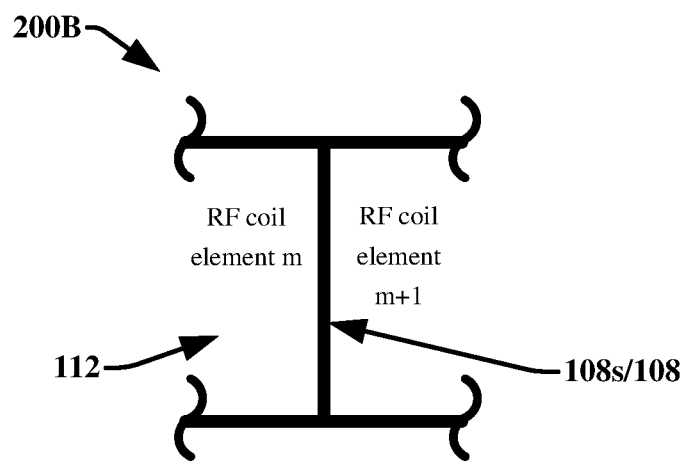
FIG. 2B is a view of an example of a portion of a gapped degenerate birdcage MRI RF coil at a shared rung of the gapped degenerate birdcage MRI RF coil.

FIG. 2B illustrates a view of an example of a portion 200B of the gapped degenerate birdcage MRI RF coil 104 of FIG. 1A at a shared rung 108s.

The shared rungs 108s are shared by two of the RF coil elements 112, which directly neighbor and which are respectively labeled RF coil element m and RF coil element m+1. The label m is an integer representing an index for the RF coil elements 112, where the RF coil elements are indexed from 1 to m; m is a total number (e.g., six or the like) of the RF coil elements 112.

Figure 3:
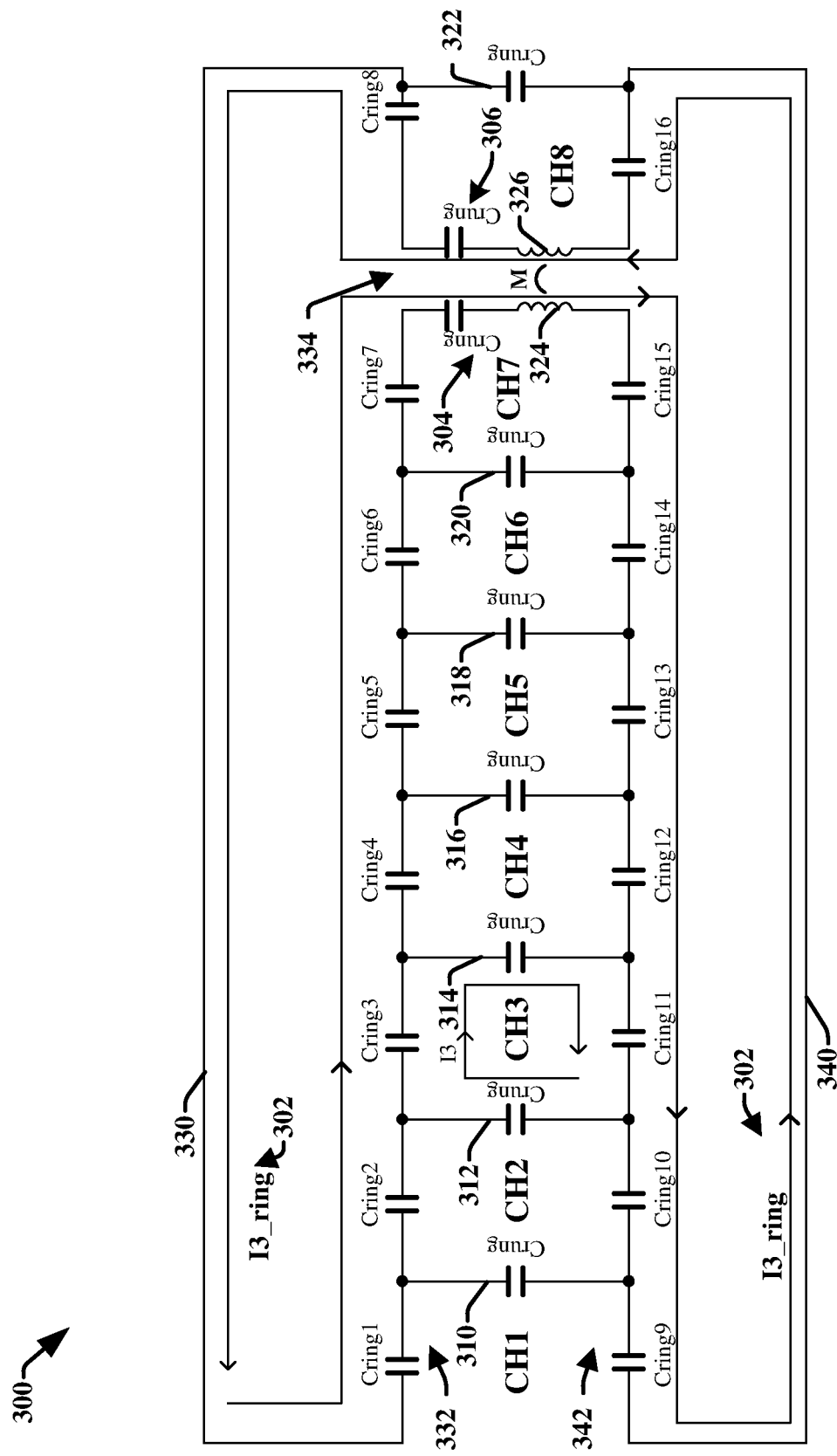
FIG. 3 is a flattened view of an example of a gapped degenerate birdcage MRI RF coil.

FIG. 3 illustrates a flattened view of an example of a gapped degenerate birdcage MRI RF coil 300.

The gapped degenerate birdcage MRI RF coil 300 may, for example, be shaped for a head anatomy, a knee anatomy, a leg anatomy, a wrist anatomy, or some other suitable anatomy. Further, while shown flattened, the gapped degenerate birdcage MRI RF coil 300 can extend circumferentially around an axis of a cylindrical-like former. The gapped degenerate birdcage MRI RF coil 300 includes a first end ring 330 on a first side 332 of the gapped degenerate birdcage MRI RF coil 300 and includes a second end ring 340 on a second side 342 of the gapped degenerate birdcage MRI RF coil 300. Further, the gapped degenerate birdcage MRI RF coil 300 includes a plurality of rungs extending from the first end ring 330 to the second end ring 340. The plurality of rungs include shared rings 310-322 (see, e.g., FIG. 2B) and non-shared rungs 304 and 306 (see, e.g., FIG. 2A).

The first end ring 330, the second end ring 340, and the plurality of rungs form a row of RF coil elements. The RF coil elements may also be referred to as meshes or channels and are labeled respectively as CH1-CH8. The RF coil elements CH1-CH8 include a first series of ring capacitors (e.g., Cring1 thru Cring 8) on the first end ring 330, a second series of ring capacitors (e.g., Cring9 thru Cring16) on the second end ring 340, a series of rung capacitors (e.g., Crung) on the plurality of rungs. The ring and rung capacitors may, for example, tune the gapped degenerate birdcage MRI RF coil 300 to a degenerate mode. Further, two directly neighboring RF coil elements (e.g., CH7 and CH8) in the row respectively include the non-shared rungs 304, 306, which are separated by a mechanical gap 334.

During use of the gapped degenerate birdcage MRI RF coil 300, the RF coil elements CH1-CH8 may be separately driven (e.g., with a separate phase and/or magnitude), thereby producing loop or mesh currents at each of the RF coil elements CH1-CH8. Further, because of the degenerate mode, the RF coil elements CH1-CH8 have high isolation and a loop or mesh current in one RF coil element has no effect on the loop or mesh current in another RF coil element. This is schematically illustrated by loop or mesh current I3 at RF coil element CH3 inducing no loop or mesh current in any of the other RF coil elements. Further, each loop or mesh current induces a ring current. For example, driving RF coil element CH3 to produce loop or mesh current I3 results in ring current I3_ring in the first and second end rings 330, 340.

The non-shared rungs 304, 306 include corresponding rung capacitors Crung and have corresponding inductances 324, 326 coupled together by a mutual inductance M. The inductances 324, 326 may, for example, be intrinsic from a copper trace or the like forming the non-shared rungs 304, 306. The coupling may degrade isolation between the two directly neighboring RF coil elements and may hence degrade imaging performance. Therefore, a transformer, an overlap between the two directly neighboring RF coil elements, or the like may minimize the mutual inductance M and decouple the two directly neighboring RF coil elements.

Additionally, the non-shared rungs 304, 306 may generate magnetic fields that degrade imaging performance. Therefore, the non-shared rungs 304, 306 are in close proximity so magnetic fields produced by the non-shared rungs 304, 306 cancel each other. Because of the mechanical gap 334, the first and second end rings 330, 340 share an end ring current 302 (e.g., I3_ring) and are effectively one combined end ring. As a result, the currents through the non-shared rungs 304, 306 are the same, but pass through the mechanical gap 334 in opposite directions. Hence, the magnetic fields cancel when the non-shared rungs 304, 306 are close.

Because the magnetic fields produced by the non-shared rungs 304, 306 may cancel, and because of the decoupling between the two directly neighboring RF coil elements, the gapped degenerate birdcage MRI RF coil 300 may operate similar to (e.g., have a similar current pattern as) a non-gapped degenerate birdcage MRI RF coil operating in the counter-rotation mode. Thus, the gapped degenerate birdcage MRI RF coil 300 may operate in a degenerate mode in which isolation among the RF coil elements CH1-CH8 is high and transmit efficiency is high. The high isolation, in turn, allows the gapped degenerate birdcage MRI RF coil 300 to be used in pTx mode, a phased array Rx mode, or the like.

In some aspects, the gapped degenerate birdcage MRI RF coil 300 generates at least two advantages over non-gapped degenerate birdcage MRI RF coils. First, the gapped degenerate birdcage MRI RF coil 300 has less modes of operation. In particular, the gapped degenerate birdcage MRI RF coil 300 has one less mode resulting from the first and second end rings 330, 340 because current in the first and second end rings 330 is the same. In effect, there is only one combined end ring with one end ring current 302, for example.

For non-gapped degenerate birdcage MRI RF coil, the two end rings and their coupling (e.g., by mutual inductance) creates a co-rotation mode and a counter-rotation mode. The co-rotation/counter-rotation mode is defined as the two end ring currents flowing in same/opposite directions. The counter-rotation mode has the same current pattern as a gapped degenerate birdcage MRI RF coil ring current and the co-rotation does not. Normally the counter rotation mode frequency is higher than a working frequency of the MRI RF coil and the co-rotation mode frequency is lower than the working frequency of the MRI RF coil. However, if the co-rotation mode is too close to the working frequency, tuning of the degenerate birdcage coil becomes more difficult.

The gapped degenerate birdcage MRI RF coil 300 eliminates the co-rotation mode, with the first and second end rings 330, 340 operating in only one mode, effectively making the operation of this configuration almost the same as the counter-rotation mode. This, in turn, simplifies tuning of the gapped degenerate birdcage MRI RF coil 300.

Another advantage of the gapped degenerate birdcage MRI RF coil 300 is that it has no electrical connection at the non-shared rungs 304, 306 since there is the mechanical gap 334 between the non-shared rungs 304, 306. This may, for example, provide additional advantages in some applications (e.g., in a split coil design).

Figure 4:
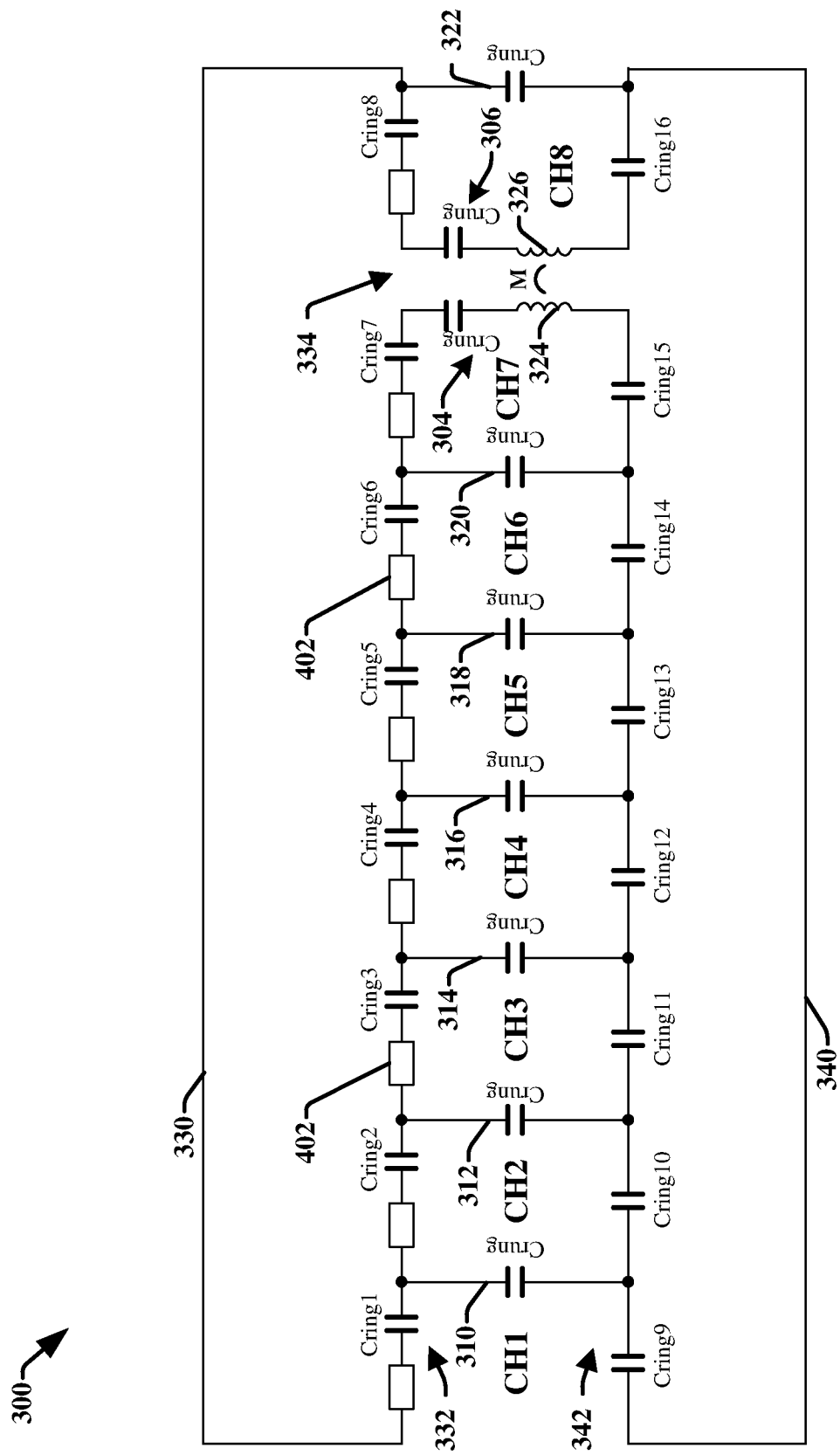
FIG. 4 is a flattened view of an example of a gapped degenerate birdcage MRI RF coil having feed boards on a common ring side.

FIG. 4 illustrates a flattened view of an example of the gapped degenerate birdcage MRI RF coil 300 of FIG. 3 in which the gapped degenerate birdcage MRI RF coil 300 further includes a plurality of feed boards 402 on a common ring side. In some aspects, the feed boards 402 correspond to the RF coil elements CH1-CH8 with a one-to-one correspondence and each feed board is at a different one of the RF coil elements CH1-CH8.

During operation of the gapped degenerate birdcage MRI RF coil 300, each of the RF coil elements CH1-CH8 has a mesh or loop current that flows in a closed loop. In some aspects, each of the RF coil elements CH1-CH8 is driven with its own RF power amplitude and phase through its corresponding one of the feed boards 402. The feed boards 402 may, for example, be or include matching circuits and/or the like.

Figure 5:
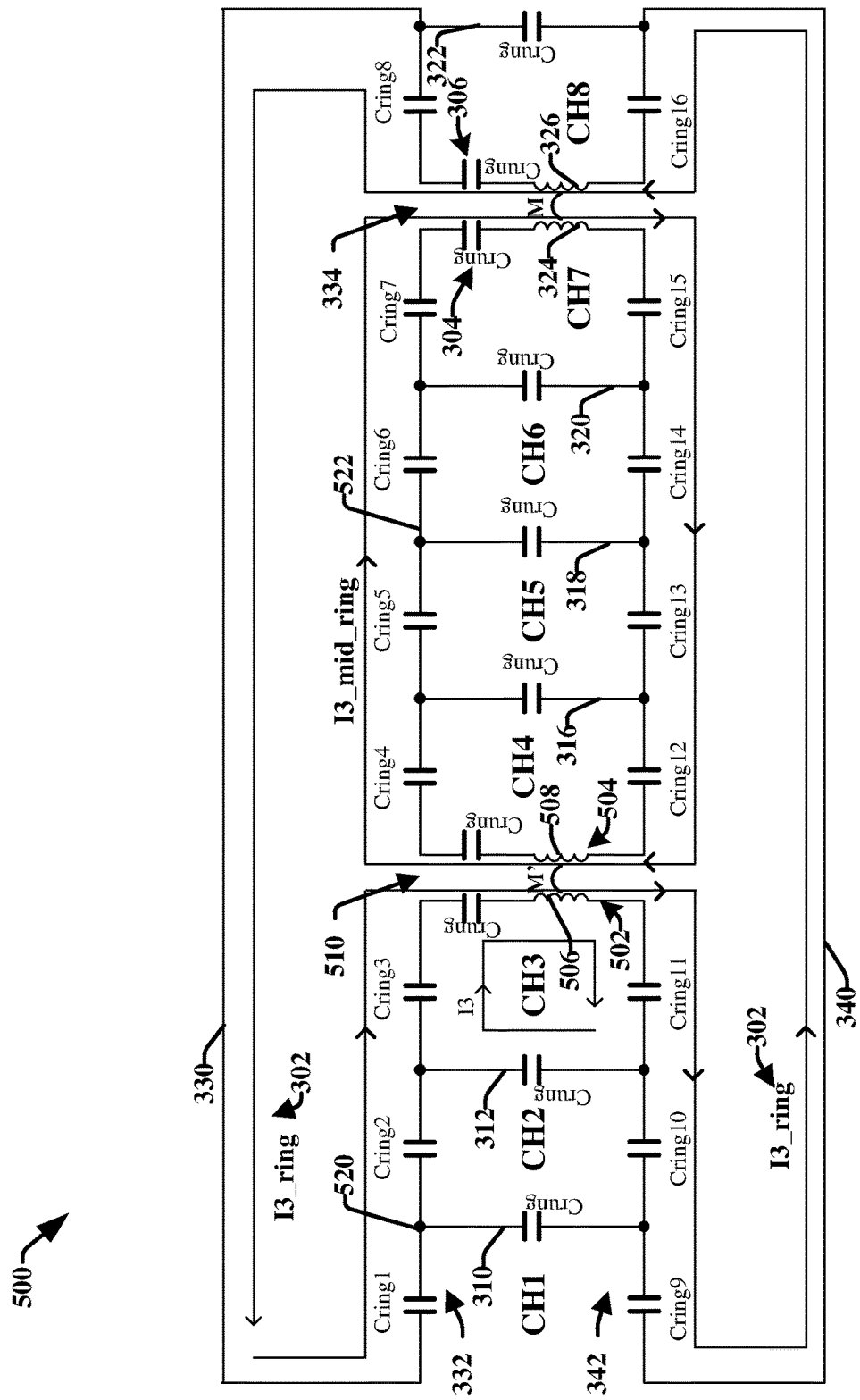
FIG. 5 is a flattened view of an example of a gapped degenerate birdcage MRI RF coil in which the gapped degenerate birdcage MRI RF coil has two gaps.

FIG. 5 illustrates a flattened view of an example of a gapped degenerate birdcage MRI RF coil 500 in which the gapped degenerate birdcage MRI RF coil has two gaps: a first mechanical gap 334 and a second mechanical gap 510. Because of the two gaps 334, 510, the gapped degenerate birdcage MRI RF coil 500 may comprise N RF coil elements and N+2 rungs, where N is an integrated greater than 4 or some other suitable value.

While many aspects of FIG. 5 are similar to the gapped degenerate birdcage MRI RF coil 300 of FIG. 3, the gapped degenerate birdcage MRI RF coil 500 further includes additional non-shared rungs 502, 504 in place of shared rung 314 in FIG. 3. The additional non-shared rungs 502, 504 include corresponding rung capacitors Crung and have corresponding inductances 506, 508 coupled together by a mutual inductance M'. The additional non-shared rungs 502, 504 are separated from each other by the second mechanical gap 510. Further, additional non-shared rungs 502, 504 are sufficiently close so their magnetic fields cancel each other during operation when the two rungs' currents are opposite.

In some aspects, the second mechanical gap 510 can be opposite to the first mechanical gap 334 when the gapped degenerate birdcage MRI RF coil 500 is circumferentially arranged around a cylindrical-like former. Put another way, the second mechanical gap 510 can be located opposite to (e.g., 180 degrees from) the first mechanical gap 334 along a circumference. Further, the two directly neighboring RF coil elements (e.g., CH3 and CH4) at the second mechanical gap 510 can also be configured with either an overlap, a transformer, or the like to minimize the mutual inductance M' at the second mechanical gap 510 and to hence decouple the two directly neighboring RF coil elements at the second mechanical gap 510.

Effectively, the first and second mechanical gaps 334, 510 form a first logical ring 520 and a second logical ring 522. When RF power is applied to RF coil element CH3, loop or mesh current I3 is generated in RF coil element CH3. Further, a first ring current I3_ring flows along the first logical ring 520 and a second ring current I3_mid_ring flows along the second logical ring 522. The first logical ring 520 extends along portions of first and second end rings 330, 340 at the first, second, third, and eighth RF coil elements CH1-CH3, CH8, whereas the second logical ring 522 extends along remaining portions of the first and second end rings 330, 340 at the fourth, fifth, sixth, and seventh RF coil elements CH4-CH8.

The two logical rings 520 and 522 have a very large mutual inductance with their coupling coefficient being positive even though there are good isolations for the directly neighboring RF coil elements at the first and second mechanical gaps 334, 510 (e.g., RF coil elements CH7 and CH8, as well as RF coil elements CH3 and CH4). The reason that the mutual inductance is large is that the two logical rings 520 and 522 are large and directly facing each other. This large and positive coupling factor induces a large voltage and generates the second ring current I3_mid_ring flowing through the second logical ring 602.

Similar to the single gap configuration of FIG. 3, magnetic fields from the ring currents at both the first and second mechanical gaps 334, 510 can cancel each other due to opposite directions and similar magnitudes at the first and second mechanical gaps 334, 510. As a result, the remaining current pattern is still similar to the non-gapped degenerate birdcage MRI RF coil in the counter-rotational mode. This means that the gapped degenerate birdcage MRI RF coil 500 remains configured with sufficient isolations among all RF coil elements CH1-CH8.

In some aspects, a coupling coefficient between the two logical rings 520 and 522 is always smaller than 1. As a result, the second ring current I3_mid_ring may be smaller than the first ring current I3_ring, whereby an achieved isolation between RF coil elements may be less than with the gapped degenerate birdcage MRI RF coil 300 of FIG. 3. However, the isolations may still be good for a pTx application. An advantage of the dual gap configuration, compared to the single gap configuration, is that gapped birdcage MRI RF coil 500 may have two completely separate parts without electrical connections, which may provide an additional advantage to a split design with respect to reliability.

As seen hereafter, the gapped degenerate birdcage MRI RF coils may have one or two mechanical gaps. Three or more mechanical gaps may be amenable. However, imaging performance may be poor. More mechanical gaps lead to more logical rings and weaker coupling between the logical rings. The weaker coupling leads to poor cancellation of ring-current magnetic fields at the three or more gaps and may hence lead to poor imaging performance.

Besides the one row configuration of the gapped degenerate birdcage MRI RF coil (e.g., as in FIGS. 1A, 3, 4, and 5), the gapped degenerate birdcage MRI RF coil can be configured with multiple rows, with any one or more aspects described herein in one or more of the rows of RF coil elements. For example, a two-row layout can be configured so that each row has one or more gaps. In some embodiments, each row is limited to one or two gaps.

Figure 6:
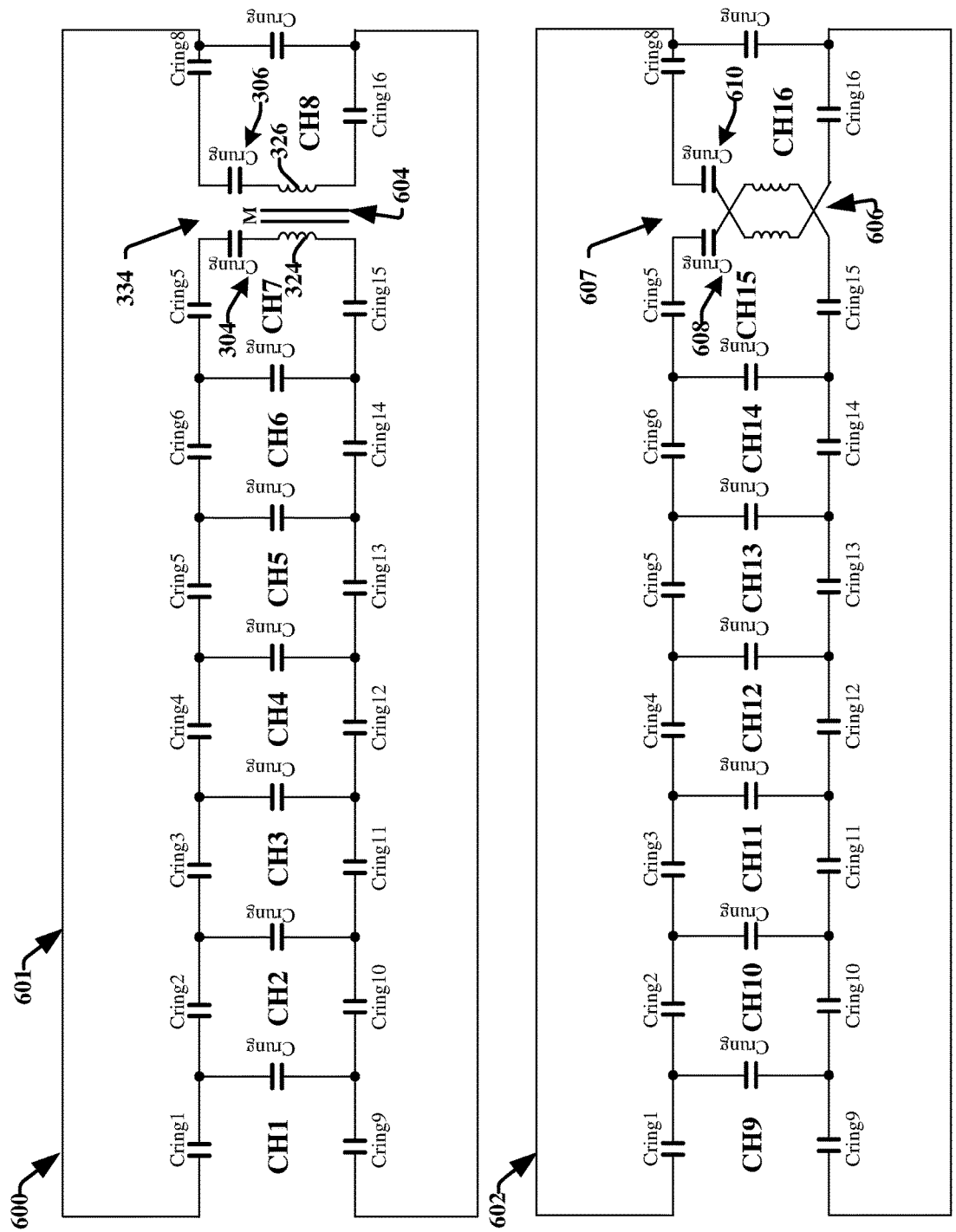
FIG. 6 is a flattened view of an example of a gapped degenerate birdcage MRI RF coil having two rows of RF coil elements.

FIG. 6 is a flattened view of an example of a gapped degenerate birdcage MRI RF coil 600 having two rows of RF coil elements.

The gapped degenerate birdcage MRI RF coil 600 is flattened for ease of illustration, but may, for example, be circumferentially arranged around a cylindrical former (e.g., as in FIG. 1A). Further, the gapped degenerate birdcage MRI RF coil 600 may, for example, be employed in a Tx mode or an Rx mode, according to various aspects discussed herein.

Rather than including one row of RF coil elements (e.g., as in FIG. 3), the gapped degenerate birdcage MRI RF coil 700 includes a first row 601 of RF coil elements and a second row 602 of RF coil elements that are configured to operate together. Further, although two rows of RF coil elements are configured, more than two rows may also be configured as an MRI RF coil to surround a cylindrical-like former for MRI.

The RF coil elements in the first row 601 are illustrated as in the FIG. 3, whereby similar reference numbers are used. For example, the RF coil elements in the first row 601 are labeled respectively as RF coil elements CH1-CH8. Further, RF coil element CH7 and RF coil element CH8 are separated by a mechanical gap 334. In alternative aspects, the first row 601 may have an additional mechanical gap (e.g., as in FIG. 5).

The RF coil elements in the second row 602 are similarly illustrated as in FIG. 3 but use different reference numbers. For example, the RF coil elements in the second row 602 are labeled respectively as RF coil elements CH9-CH16. Further, RF coil element CH15 and RF coil element CH16 are separated by a mechanical gap 607. In alternative aspects, the second row 602 may have an additional mechanical gap (e.g., as in FIG. 5).

Use of multiple rows may help improve $B_1$ magnetic field uniformity. Further, while the RF coil elements in the first row 601 are shown as being aligned respectively with the RF coil elements in the second row 602, the RF coil elements in the first row 601 may be shifted relative to the RF coil elements in the second row 602. This may, for example, facilitate better isolation between the first and second rows 601, 602 and may hence improve imaging quality.

The RF coil elements (e.g., CH7 and CH8) at the non-shared rungs 304 and 306 in the first row 601 may include a transformer, a partial overlap, or the like to minimize mutual inductance between the non-shared rungs 304 and 306 and to hence decouple the RF coil elements. Similarly, the RF coil elements (e.g., CH15 and CH16) at the non-shared rungs 608 and 610 in the second row 602 may include a transformer, a partial overlap, or the like to minimize mutual inductance between the non-shared rungs 608 and 610 and to hence decouple the RF coil elements. For example, the RF coil elements at the non-shared rungs 304 and 306 in the first row 601 may include a transformer 604, whereas the RF coil elements at the non-shared rungs 608 and 610 in the second row 602 may include a partial overlap 606.

Although the number of RF coil elements in the first row 601 and the number of RF coil elements in the second row 602 are the same, the numbers may vary between the first row 601 and the second row 602. Further, although the number of mechanical gaps in the first row 601 is the same as the number of mechanical gaps in the second row 602, the numbers may vary between the first row 601 and the second row 602.

While FIG. 6 illustrates an example MRI RF coil 600 that includes various components connected in various ways, it is to be appreciated that other MRI RF coil can include other components and/or connections in other ways, and can be employed in connection with various embodiments discussed in this specification.

Figure 7:
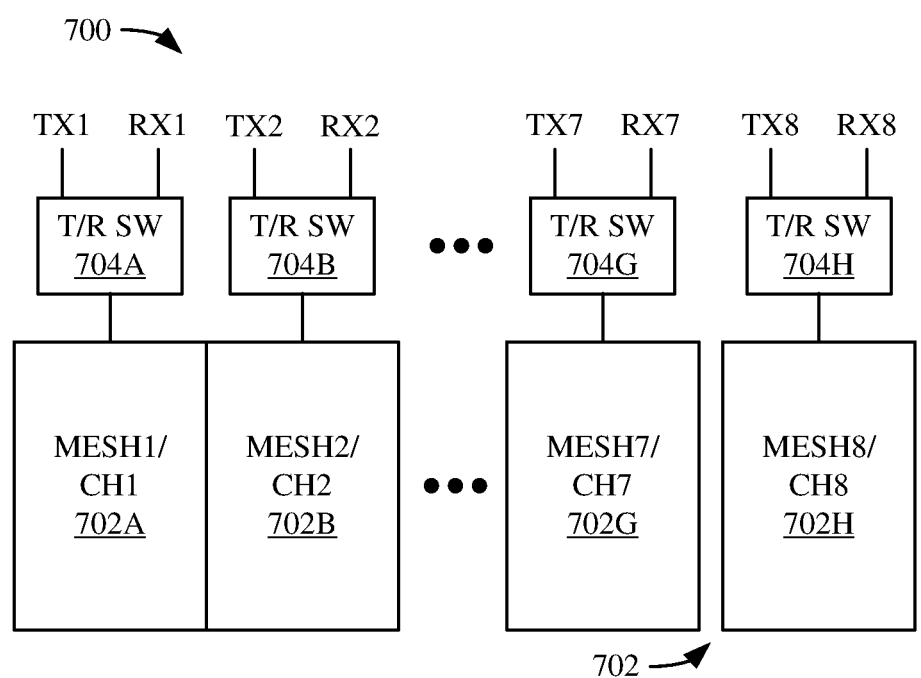
FIG. 7 is a schematic view of an example of a gapped degenerate birdcage MRI RF coil coupled to transmit/receive (T/R) switches.

Additionally, T/R switches (not shown) may be coupled to feed ports of one or more RF coil elements (e.g., channels or meshes) in order to configure gapped degenerate birdcage MRI RF coil herein for use in a pTx mode and a phase-array Rx mode. For example, FIG. 7 is a schematic view of an example of a gapped degenerate birdcage MRI RF coil 700 in which the coil is coupled to transmit/receive (T/R) switches 704A-704H.

The gapped degenerate birdcage MRI RF coil 700 comprises a plurality of RF coil elements 702A-702H (e.g., 8 different RF coil elements), which may also be referred to as meshes or channels and which are also labeled as CH1-CH8. The plurality of RF coil elements 702A-702H are arranged in a row with a mechanical gap 702 (e.g., as in FIG. 1A) separating two directly neighboring RF coil elements (e.g., CH7 and CH8).

Each RF coil element 702A-702H may be driven by its own RF power amplifier (RFPA). Further, each RF coil element 702A-702H is coupled to a corresponding one of the T/R switches 704A-704H. In some embodiments, the RFPA and/or associated T/R switch 704A-704H for a RF coil element 702A-702H may couple to a corresponding feed board (e.g., as depicted in FIG. 4). Each T/R switch 704A-704H includes a transmission input TX1-TX8 (e.g., to receive a signal to drive the associated mesh/channel) and a reception output RX1-RX8 (to provide a signal received via the associated mesh/channel).

Additionally, because any gapped degenerate birdcage MRI RF coils herein has good isolations among the RF coil elements, the coil can also be used as an inductive coil which can boost Tx efficiency of the system built-in whole-body coil (WBC) in Tx mode, and also boost a signal-to-noise ratio (SNR) in Rx mode.

Additionally, any gapped degenerate birdcage MRI RF coil herein can also be used as a single-layer technology (SLT) coil which inductively couples to the WBC in Tx mode for a Tx efficiency boost and which is used as a standard phased array coil in Rx mode.

FIG. 8 is a flow diagram of an example of a process 800 for performing MRI using a gapped degenerate birdcage MRI RF coil.

At 810, a gapped degenerate birdcage MRI RF coil is provided. The gapped degenerate birdcage MRI RF coil includes a pair of directly neighboring RF coil elements (e.g., CH7 and CH8 in FIG. 3) in a row of RF coil elements (e.g., CH1-CH8 in FIG. 3) with a mechanical gap separating the pair of directly neighboring RF coil elements. The gapped degenerate birdcage MRI RF coil may, for example, be as in any of FIG. 1A, 1B, or 3-7.

At 820, MRI is performed on a scan target to generate an image of the scan target at a working frequency. The gapped degenerate birdcage MRI RF coil is used as a transmit coil and/or as a receive coil while performing the MRI.

The process flow 800 can further include minimizing coupling between the pair of directly neighboring RF coil elements in the row of RF coil elements via a transformer, a partial overlap, or the like.

Figure 9:
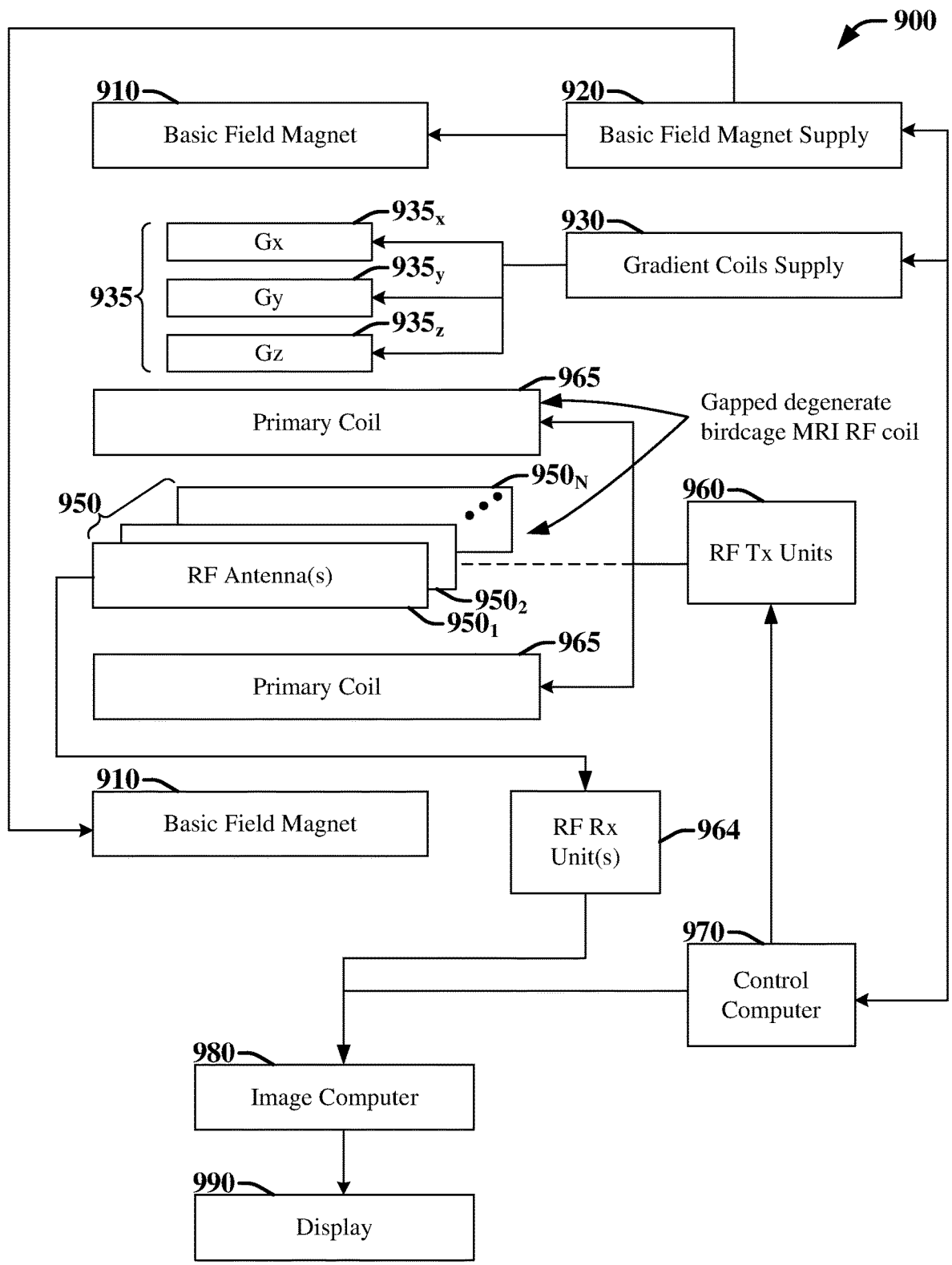
FIG. 9 illustrates a block diagram of an example of an MRI system comprising a gapped degenerate birdcage MRI RF coil.

FIG. 9 is a block diagram of some aspects of an MRI system 900 comprising a gapped degenerate birdcage MRI RF coil.

The MRI system 900 includes one or more basic field magnets 910 and a basic field magnet supply 920. Ideally, the basic field magnet(s) 910 produce a uniform $B_0$ field. However, in practice, the $B_0$ field may not be uniform, and may vary over an object being imaged by the MRI system 900. The MRI system 900 can include gradient coils 935 configured to emit gradient magnetic fields like Gx (e.g., via an associated gradient coil $935_x$), Gy (e.g., via an associated gradient coil $935_y$), and Gz (e.g., via an associated gradient coil $935_z$). The gradient coils 935 can be controlled, at least in part, by a gradient coil supply 930. In some examples, the timing, strength, and orientation of the gradient magnetic fields can be controlled, and thus selectively adapted during an MRI procedure.

The MRI system 900 can include a primary coil 965 configured to generate RF pulses. The primary coil 965 can be a WBC. The primary coil 965 can be, for example, a gapped degenerate birdcage MRI RF coil according to the configuration or process flow of FIGS. 1A through 8. The primary coil 965 can be controlled, at least in part, by one or more RF transmission units 960. The RF transmission unit(s) 960 can provide a signal to the primary coil 965.

The MRI system 900 can include a set of RF antennas 950 (e.g., one or more RF antennas $950_1$-$950_N$, which can be as described herein). The RF antennas 950 can be configured to generate RF pulses and/or to receive resulting magnetic resonance signals from an object to which the RF pulses are directed. An RF antenna 950 configured solely to generate RF pulses can be referred to herein as a Tx antenna (or coil or coil array), while an RF antenna 950 configured solely to receive resulting magnetic resonance signals from an object to which the RF pulses are directed can be referred to herein as a Rx antenna (or coil or coil array). An RF antenna 950 configured to both generate RF pulses and receive resulting magnetic resonance signals can be referred to herein as a Tx/Rx antenna (or coil or coil array). Unless otherwise indicated, antennas, coils, and coil arrays discussed herein can, in various aspects, be any of a Tx antenna/coil/coil array, an Rx antenna/coil/coil array, or a Tx/Rx antenna/coil/coil array.

In some aspects, the RF antennas 950 can be configured to inductively couple with the primary coil 965, and to generate RF pulses and/or to receive resulting magnetic resonance signals from an object to which the RF pulses are directed. In other aspects, the RF antennas 950 can be electrically coupled to a power source (e.g., the RF transmission unit(s) 960) that can drive the RF antennas 950 to generate RF pulses, and the RF antennas 950 can also be configured to receive resulting magnetic resonance signals from an object to which the RF pulses are directed. In one embodiment, one or more members of the set of RF antennas 950 can be fabricated from flexible coaxial cable or other conductive material. The set of RF antennas 950 can be connected with one or more RF receive units 964. In some aspects, one or more members of the set of RF antennas 950 are or form a gapped degenerate birdcage MRI RF according to the configurations or process flows herein as described in aspects above via FIGS. 1A through 8.

The gradient coils supply 930 and the RF transmission unit(s) 960 can be controlled, at least in part, by a control computer 970. The magnetic resonance signals received from the set of RF antennas 950 can be employed to generate an image, and thus can be subject to a transformation process like a two-dimensional fast Fourier transform (FFT) that generates pixelated image data. The transformation can be performed by an image computer 980 or other similar processing device. The image data can then be shown on a display 990. The RF receive unit(s) 964 can be connected with the control computer 970 or the image computer 980.

While FIG. 9 illustrates an example MRI system 900 that includes various components connected in various ways, it is to be appreciated that other MRI systems can include other components connected in other ways, and can be employed in connection with various aspects discussed herein.

In one embodiment, the MRI system 900 includes the control computer 970. In some aspects, a member of the set of RF antennas 950 can be individually controllable by the control computer 970. The control computer 970 can provide a DC bias current, or control a DC bias control circuit to control the application of a DC bias current, to PIN diodes that can be part of the antennas 950 and/or the primary coil 965.

In some aspects, one or more members of the set of RF antennas 950 can be or comprise any example Tx coil, MRI RF coil (e.g., surface coil), coil element, or the like described herein. In some aspects, one, some, or all members of the set of RF antennas 950 can be or correspond to any example RF coil or process flow in FIGS. 1A through 8. In some aspects, one or more members of the set of RF antennas 950 are or form a gapped degenerate birdcage MRI RF coil according to any one of configurations of an MRI RF coil 104, 300, 500, 600, or 700 (see, e.g., FIGS. 1 through 8) as described above. Further, in some of such aspects, the MRI system 900 employs the degenerate birdcage coil for pTx. In some aspects, the controller can provide any of the aforementioned coils with a current, a voltage, a control signal, or the like.

In lieu of the foregoing, the present application is directed to a gapped degenerate birdcage MRI RF coil.

A first example can comprise a degenerate birdcage MRI RF coil on a cylindrical-like former, comprising: a first row of RF coil elements that circumferentially surround an axis of the cylindrical-like former, wherein a first pair of directly neighboring RF coil elements in the first row are separated from each other by a first gap; and at least one of: a first transformer configured to minimize inductive coupling between the first pair of directly neighboring RF coil elements, or a partial overlap between the first pair of directly neighboring RF coil elements.

A second example can include the first example, wherein a second pair of directly neighboring RF coil elements in the first row are separated from each other by a second gap.

A third example can include any one or more of the first through second examples, further comprising: a second row of RF coil elements that circumferentially surrounds the axis of the cylindrical-like former, where a pair of directly neighboring RF coil elements in the second row are separated from each other by a gap.

A fourth example can include any one or more of the first through third examples, wherein the first row of RF coil elements comprises a first number of RF coil elements and the second row of RF coil elements comprises a second number of RF coil elements that is different from the first number.

A fifth example can include any one or more of the first through fourth examples, wherein the first row of RF coil elements comprises a plurality of rungs partially defining the RF coil elements of the first row, and wherein the first pair of directly neighboring RF coil elements are partially defined by individual pairs of rungs that are non-overlapping.

A sixth example can include any one or more of the first through fourth examples, further comprising: a first end ring at one side of the first row of RF coil elements; and a second end ring at another side of the first row of RF coil elements; wherein the first gap is configured so a first end ring current of the first end ring and a second end ring current of the second end ring are the same.

A seventh example can include any one or more of the first through sixth examples, wherein the RF coil elements of the first row comprise corresponding transmit (T)/receive (R) switches configured to switch the RF coil elements between a parallel transmit mode and a phase array receive mode.

An eighth example can include any one or more of the first through seventh examples, further comprising: a plurality of rungs partially forming the RF coil elements of the first row, wherein each of the plurality of rungs is shared by two of the RF coil elements of the row except for a pair of non-shared rungs at the first gap, and wherein the pair of non-shared rungs are individual to the first pair of directly neighboring RF coil elements.

A ninth example can include any one or more of the first through eighth examples, wherein a second pair of directly neighboring RF coil elements in the first row are separated from each other by a second gap, and wherein the degenerate birdcage MRI RF coil comprises: a plurality of rungs partially forming the RF coil elements of the first row, wherein each of the plurality of rungs is shared by two of the RF coil elements of the row except for a first pair of non-shared rungs at the first gap and a second pair of non-shared rungs at the second gap, wherein the first pair of non-shared rungs are individual to the first pair of directly neighboring RF coil elements, and wherein the second pair of non-shared rungs are individual to the second pair of directly neighboring RF coil elements.

A tenth example is a MRI system, comprising: a degenerate birdcage MRI RF coil on a cylindrical former and configured to operate in a transmit mode or a receive mode, wherein the degenerate birdcage MRI RF coil comprises: a first end ring and a second end ring; and a plurality of rungs extending from the first end ring to the second end ring along an axis of the cylindrical former, wherein the first end ring, the second end ring, and the plurality of rungs form a row of RF coil elements, and wherein the first end ring and the second end ring include individual breaks between a pair of directly neighboring rungs of the plurality of rungs; and a decoupling feature configured to inductively decouple a pair of neighboring rungs.

An eleventh example can include the tenth example, wherein the first end ring and the second end ring are coupled to one another at the individual breaks so as to share a current.

A twelfth example can include any one or more of the tenth through eleventh examples, further comprising: a WBC, wherein the degenerate birdcage MRI RF coil is a local coil configured to inductively couple to the WBC.

A thirteenth example can include any one or more of the tenth through twelfth examples, wherein the decoupling feature comprises an overlap between a pair of directly neighboring RF coil elements in the row of RF coil elements, wherein the pair of directly neighboring rungs are individual to the pair of directly neighboring RF coil elements.

A fourteenth example can include any one or more of the tenth through thirteenth examples, wherein the degenerate birdcage MRI RF coil is a WBC.

A fifteenth example can include any one or more of the tenth through fourteenth examples, wherein the first end ring and the second end ring include additional individual breaks between an additional pair of directly neighboring rungs of the plurality of rungs, wherein the pair of directly neighboring rungs are individual to different RF coil elements in the row, and wherein the pair of additional directly neighboring rungs are individual to different RF coil elements in the row.

A sixteenth example can include any one or more of the tenth through fifteenth examples, wherein the degenerate birdcage MRI RF coil further comprises: a third end ring and a fourth end ring; and a plurality of additional rungs extending from the third end ring to the fourth end ring, wherein the third end ring, the fourth end ring, and the plurality of additional rungs form an additional row of RF coil elements, and wherein two directly neighboring RF coil elements in the additional row are separated from each other by a mechanical gap.

A seventeenth example can include any one or more of the tenth through sixteenth examples, wherein the degenerate birdcage MRI RF coil has N RF coil elements and N+1 or N+2 rungs.

An eighteenth example is a method for MRI, comprising: providing a degenerate birdcage MRI RF coil that includes a pair of directly neighboring RF coil elements in a row of RF coil elements, wherein a gap mechanically and electrically separates the pair of directly neighboring RF coil elements at non-shared rungs individual to the pair of directly neighboring RF coil elements; and performing MRI on a scan target to generate an image of the scan target at a working frequency, wherein the degenerate birdcage MRI RF coil is used as a transit coil and/or as a receive coil while performing the MRI.

A nineteenth example can include the eighteenth example, further comprising: minimizing inductive coupling between the pair of directly neighboring RF coil elements in the row of RF coil elements via a transformer.

A twentieth example can include the eighteenth example, further comprising: minimizing inductive coupling between the pair of directly neighboring RF coil elements in the row of RF coil elements via a partial overlap of the pair of directly neighboring RF coil elements.

The following includes definitions of selected terms employed herein. The definitions include various examples or forms of components that fall within the scope of a term and that may be used for implementation. The examples are not intended to be limiting. Both singular and plural forms of terms may be within the definitions.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments belong. It will be further understood that terms (e.g., those defined in commonly used dictionaries) should be interpreted as having a meaning that is consistent with their meaning in the context of the relevant art and will not be interpreted in an idealized or overly formal sense unless expressly so defined herein.

In the above description, some components may be displayed in multiple figures carrying the same reference signs but may not be described multiple times in detail. A detailed description of a component may then apply to that component for all its occurrences.

The detailed descriptions presented herein may be presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on refer to actions and processes of a computer system, logic, processor, or similar electronic device that manipulates and transforms data represented as physical and/or electronic quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

What is claimed is:

1. A degenerate birdcage magnetic resonance imaging (MRI) radio frequency (RF) coil on a cylindrical-like former, comprising:
   a first end ring and a second end ring;
   a plurality of rungs extending from the first end ring to the second end ring;
   a first row of RF coil elements that circumferentially surround an axis of the cylindrical-like former and that are formed by the first end ring, the second end ring, and the plurality of rungs, wherein a first pair of directly neighboring RF coil elements in the first row are separated from each other by a first gap; and
   at least one of:
      a first transformer configured to minimize inductive coupling between the first pair of directly neighboring RF coil elements, or a partial overlap between the first pair of directly neighboring RF coil elements;
   wherein the plurality of rungs comprise a pair of non-shared rungs, which border each other at the first gap and which are individual to the first pair of directly neighboring RF coil elements, and wherein the first and second end rings separate each of the plurality of rungs, except the pair of non-shared rungs, from each other circumferentially around the axis.

2. The degenerate birdcage MRI RF coil of claim 1, further comprising:
   a second row of RF coil elements that circumferentially surrounds the axis of the cylindrical-like former, where a pair of directly neighboring RF coil elements in the second row are separated from each other by a second gap.

3. The degenerate birdcage MRI RF coil of claim 2, wherein the first row of RF coil elements comprises a first number of RF coil elements and the second row of RF coil elements comprises a second number of RF coil elements that is different from the first number.

4. The degenerate birdcage MRI RF coil of claim 1, wherein the pair of non-shared rungs are non-overlapping.

5. The degenerate birdcage MRI RF coil of claim 1, wherein the first gap is configured so a first end ring current of the first end ring and a second end ring current of the second end ring are a same current.

6. The degenerate birdcage MRI RF coil of claim 1, wherein the RF coil elements of the first row comprise corresponding transmit (T)/receive (R) switches configured to switch the RF coil elements between a parallel transmit mode and a phase array receive mode.

7. The degenerate birdcage MRI RF coil of claim 1, wherein each of the plurality of rungs is shared by two of the RF coil elements of the first row except for the pair of non-shared rungs at the first gap.

8. The degenerate birdcage MRI RF coil of claim 1, wherein the pair of non-shared rungs are spaced from and overlap with each other.

9. The degenerate birdcage MRI RF coil of claim 1, further comprising:
   a plurality of capacitors respectively on the plurality of rungs, the first end ring, and the second end ring, wherein capacitance values of the plurality of capacitors are such that, all resonant modes, except a ring resonant mode correspond to a same frequency.

10. A magnetic resonance imaging (MRI) system, comprising:
    a degenerate birdcage MRI radio frequency (RF) coil on a cylindrical former and configured to operate in a transmit mode or a receive mode, wherein the degenerate birdcage MRI RF coil comprises:
       a first end ring and a second end ring;
       a plurality of rungs extending from the first end ring to the second end ring along an axis of the cylindrical former; and
       a row of RF coil elements, formed by the first end ring, the second end ring, and the plurality of rungs, wherein the row of RF coil elements includes a first pair of RF coil elements that directly neighbor each other circumferentially around the cylindrical former and a second pair of RF coil elements that directly neighbor each other circumferentially around the cylindrical former, wherein the first pair of RF coil elements include individual non-shared rungs that directly neighbor and crossover each other while remaining spaced from each other, and wherein an RF coil element of the second pair of RF coil elements shares a rung with another RF coil element of the second pair of RF coil elements and shares another rung with an RF coil element of the first pair of RF coil elements.

11. The MRI system of claim 10, wherein the first end ring and the second end ring are coupled to one another at individual breaks so as to share a current.

12. The MRI system of claim 10, further comprising:
a whole-body coil (WBC), wherein the degenerate birdcage MRI RF coil is a local coil configured to inductively couple to the WBC.

13. The MRI system of claim 10, wherein the degenerate birdcage MRI RF coil is a whole-body coil (WBC).

14. The MRI system of claim 10, wherein the first end ring and the second end ring include additional individual breaks between a pair of directly neighboring rungs of the plurality of rungs, and wherein the pair of directly neighboring rungs are individual to RF coil elements in the row different than the first pair of RF coil elements and the second pair of RF coil elements.

15. The MRI system of claim 10, wherein the degenerate birdcage MRI RF coil further comprises:
a third end ring and a fourth end ring; and
a plurality of additional rungs extending from the third end ring to the fourth end ring, wherein the third end ring, the fourth end ring, and the plurality of additional rungs form an additional row of RF coil elements, and wherein two directly neighboring RF coil elements in the additional row are separated from each other by a mechanical gap.

16. The MRI system of claim 10, wherein the degenerate birdcage MRI RF coil has N RF coil elements and N+1 rungs.

17. The MRI system of claim 10, wherein the first and second end rings separate each of the plurality of rungs, except the individual non-shared rungs, from each other.

18. A method for magnetic resonance imaging (MRI), comprising:
providing a degenerate birdcage MRI radio frequency (RF) coil that includes a plurality of RF coil elements in a row of RF coil elements, wherein the plurality of RF coil elements comprise a first RF coil element, a second RF coil element, and a third RF coil element, wherein the second RF coil element is directly between the first and third RF coil elements in the row, wherein a gap mechanically and electrically separates the first RF coil element and the second RF coil element at non-shared rungs individual to the first RF coil element and the second RF coil element, wherein the second RF coil element and the third RF coil element share a shared rung, and wherein the non-shared rungs overlap and are spaced from each other at the gap; and
performing MRI on a scan target to generate an image of the scan target at a working frequency, wherein the degenerate birdcage MRI RF coil is used as a transmit coil and/or as a receive coil while performing the MRI.

19. The method of claim 18, further comprising:
minimizing inductive coupling between the first and second RF coil elements in the row of RF coil elements via a transformer.

20. The method of claim 18, wherein each RF coil element in the row, except the first and second RF coil elements, is between and shares a pair of rungs respectively with two neighboring RF coil elements in the row, and wherein each of the first and second RF elements has only one birdcage rung shared with another RF coil element in the row.

21. The method of claim 18, wherein the degenerate birdcage MRI RF coil comprises a first end ring, a second end ring, and a plurality of rungs, wherein the plurality of rungs extend from the first end ring to the second end ring and comprise the non-shared rungs and the shared rung, wherein the first and second end rings and the plurality of rungs form the plurality of RF coil elements, and wherein the first and second end rings separate each of the plurality of rungs, except the non-shared rungs, from each other.

* * * * *